(12) United States Patent
Stockschlaeder et al.

(10) Patent No.: US 10,259,128 B2
(45) Date of Patent: Apr. 16, 2019

(54) HUMAN-ROBOT COLLABORATION WORKSTATION WITH A MOUNTING DEVICE

(71) Applicant: KUKA Systems GmbH, Augsburg (DE)

(72) Inventors: Julian Stockschlaeder, Augsburg (DE); Hans Glatz, Augsburg (DE)

(73) Assignee: KUKA Systems GmbH, Augsburg (DE)

( * ) Notice: Subject to any disclaimer, the term of this patent is extended or adjusted under 35 U.S.C. 154(b) by 185 days.

(21) Appl. No.: 15/315,595

(22) PCT Filed: May 28, 2015

(86) PCT No.: PCT/EP2015/061878
§ 371 (c)(1),
(2) Date: Dec. 1, 2016

(87) PCT Pub. No.: WO2015/185442
PCT Pub. Date: Dec. 10, 2015

(65) Prior Publication Data
US 2017/0217028 A1    Aug. 3, 2017

(30) Foreign Application Priority Data
Jun. 2, 2014   (DE) .................. 10 2014 210 362

(51) Int. Cl.
*B25J 19/06* (2006.01)
*B25J 9/00* (2006.01)
(Continued)

(52) U.S. Cl.
CPC ............... *B25J 19/063* (2013.01); *B25B 1/18* (2013.01); *B25B 11/002* (2013.01);
(Continued)

(58) Field of Classification Search
CPC ........ B25J 9/0096; B25J 19/06; B25J 19/063; G05B 2219/40201; G05B 2219/40202
See application file for complete search history.

(56) References Cited

U.S. PATENT DOCUMENTS

| | | | | |
|---|---|---|---|---|
| 4,603,464 A | * | 8/1986 | Smith, Jr. | ............... E21B 19/16 29/428 |
| 5,107,582 A | * | 4/1992 | Kessler | ............... B23Q 3/1578 414/735 |

(Continued)

FOREIGN PATENT DOCUMENTS

WO    2014049637 A1    4/2014

OTHER PUBLICATIONS

European Patent Office; Search Report and Written Opinion in International Patent Application No. PCT/EP2015/061878 dated Sep. 30, 2015; 9 pages.

*Primary Examiner* — Ryan Rink
(74) *Attorney, Agent, or Firm* — Dorton & Willis, LLP (57) ABSTRACT

A human-robot collaboration (HRC) workstation includes a robot having a robot controller and a robot arm comprising a plurality of joints and links connecting the joints. The joints are automatically adjusted by the controller to move or hold in space a tool or workpiece held by the robot arm by adjusting the joints. The (HRC) workstation further comprises a mounting device having a stationary base frame and a fixing device configured to hold in place a workpiece or a tool such that the workpiece and/or tool held on the mounting device may be assembled and/or machined in interaction with the robot arm. The mounting device includes a mechanical adjusting device and a triggering device controlled by the robot controller and the adjusting device is configured to automatically adjust the fixing device relative (Continued)

to the base frame from an operating position to a safety position when the triggering device is activated.

15 Claims, 4 Drawing Sheets (51) Int. Cl.
*B25B 1/18* (2006.01)
*B25B 11/00* (2006.01)
*B25J 13/08* (2006.01)

(52) U.S. Cl.
CPC ........... *B25J 9/0096* (2013.01); *B25J 13/085* (2013.01); *G05B 2219/40201* (2013.01); *G05B 2219/40202* (2013.01)

(56) References Cited

U.S. PATENT DOCUMENTS

| | | | |
|---|---|---|---|
| 5,704,601 A * | 1/1998 | Mangelsen | B23Q 1/52 269/329 |
| 9,248,515 B2 * | 2/2016 | Chou | B23B 31/185 |
| 10,029,314 B1 * | 7/2018 | Wu | B23B 31/001 |
| 2001/0006880 A1 * | 7/2001 | Okuyama | B24B 7/228 451/286 |
| 2004/0118897 A1 | 6/2004 | Caldarone et al. | |
| 2007/0028733 A1 * | 2/2007 | Gass | B23D 47/08 83/58 |
| 2010/0044414 A1 | 2/2010 | Charbel et al. | |
| 2015/0090769 A1 * | 4/2015 | Furuta | B23K 37/0461 228/47.1 |

* cited by examiner

HUMAN-ROBOT COLLABORATION WORKSTATION WITH A MOUNTING DEVICE

CROSS-REFERENCE

This application is a national phase application under 35 U.S.C. § 371 of International Patent Application No. PCT/EP2015/061878, filed May 28, 2015 (pending), which claims the benefit of German Patent Application No. DE 10 2014 210 362.2 filed Jun. 2, 2014, the disclosures of which are incorporated by reference herein in their entirety.

TECHNICAL FIELD

The invention concerns human-robot collaboration (HRC) workstation, comprising a robot with a robot controller and with a robot arm having a plurality of joints and links connecting the joints, the joints of which can be automatically adjusted by the robot controller to hold and/or move a tool or workpiece held by the robot arm in a space by adjusting the joints of the robot arm, further comprising a clamping device with a stationary base frame and a fixing device that is configured to hold in place a workpiece or a tool, such that the workpiece and/or tool being held at the mounting device can be mounted and/or machined in interaction with the robot arm.

BACKGROUND

WO 2014/049637 A1 describes a work station for the welding of components by means of welding tongs that are guided by a robot. Two identical clamping devices are mounted in a pivotable manner on a rotary table. Each clamping device is configured to hold two components that are to be welded. By turning the rotary table, each mounting device can selectively be brought closer to the robot, so that the robot can weld the components with welding tongs that are guided by the robot itself, or brought closer to a person, i.e. a worker, so that the worker can remove a finished welded component from the mounting device and insert new components to be welded into the mounting device. Each clamping device can actively be pivoted by means of an automatic control device, so that the clamping device can be aligned differently, depending on its allocation to the worker or to the robot, by actively being moved.

SUMMARY

The object of the invention is to provide an HRC work station that includes advanced safety features.

The object of the invention is solved by an HRC work station, comprising a robot with a robot controller and with a robot arm having a plurality of joints and links connecting the joints, the joints of which can be automatically adjusted by the robot controller to hold and/or move a tool or workpiece held by the robot arm in a space by adjusting the joints of the robot arm, further comprising a clamping device with a stationary base frame and a fixing device that is configured to hold in place a workpiece or a tool, such that the workpiece and/or tool being held at the clamping device can be mounted and/or machined in interaction with the robot arm, whereby the clamping device comprises a mechanical adjusting device and a triggering device that can be controlled by the robot controller and the adjusting device is configured to automatically move the fixing device in relation to the base frame from an operating position into a safe position when the triggering device is activated.

The term HRC workstation stands for a human-robot collaboration workstation. A person, who can also be referred to as a worker, works at such an HRC work station, whereby, in spatial proximity, in particular in close cooperation with the person, an automatically actuatable robot executes movements, in particular work on a workpiece, without the robot having to be separated from the person by a safety rail. In particular, at an HRC workstation, the contact between human and robot can, if necessary, be permitted or take place, and the robot can in particular also be guided manually by the person and/or a workpiece can be handled and/or machined jointly by the person and the robot.

The inventive HRC workstation can include a workpiece that is stationarily held in place by the clamping device and a tool that is guided by the robot. The workpiece can be machined and/or assembled by the robot-guided tool. In doing so, the machining and/or assembly performed by the robot is assisted by a worker, i.e. the worker can manually affect the machining operation and/or the assembly operation, for example with additional manually guided tools and/or with manually added machine elements or other components.

The inventive HRC workstation can alternatively or additionally include a tool that is stationarily held in place by the clamping device and a workpiece that is guided by the robot. The workpiece guided by the robot can be machined and/or assembled by the stationary tool. In doing so, the machining and/or assembly performed by the robot is assisted by a worker, i.e. the worker can manually affect the machining operation and/or the assembly operation, for example with additional manually guided tools and/or with manually added machine elements or other components.

Robot arms with associated robot controllers, in particular industrial robots, are machines that can be equipped to automatically handle and/or machine objects with tools and can be programmed to move along multiple axes, for example, with respect to orientation, position and operating sequence. Industrial robots typically comprise a robot arm with multiple links connected via joints, and programmable robot controllers (control devices) that automatically control or direct the movement sequences of the robot arm during operation. The links are moved via drives, in particular electric drives that are actuated by the robot controller, in particular with respect to the movement axes of the industrial robot, which represent the degrees of freedom of the joints.

A robot arm comprising a plurality of links connected via joints can be configured as an articulated robot with multiple links and joints arranged in series one after the other. In particular, the redundant industrial robot can exhibit one robot arm with seven or more joints.

The robot can in particular be a redundant robot, which is understood to mean a robot arm that is movable by means of a robot controller and possesses more manipulatable degrees of freedom than are needed to perform a task. The degree of redundancy results from the difference in the number of degrees of freedom of the robot arm and the dimension of the event space in which the task is to be solved. It can be a kinematic redundancy or a task-specific redundancy. In the case of kinematic redundancy, the number of kinematic degrees of freedom, in general, the number of joints of the robot arm, is greater than the event space, which in a real environment is defined by movement in space through the three translational and the three rotational degrees of freedom, i.e. with six degrees of freedom. A redundant industrial robot can therefore be a lightweight robot with seven joints, for example, in particular seven swivel joints. In the case of task-specific redundancy, on the other hand, the dimension of the task is smaller than the number of kinematic degrees of freedom of the robot arm. This is the case, for example, if the robot arm carries on its hand flange a tool that is rotatable about a tool drive axis, such as an inventive screwing device, and one of the swivel joints of the robot arm is aligned along this tool drive axis.

For a force- and/or torque-controlled actuation of the joints of the robot arm, the joints of the robot arm can be parameterized with respect to their rigidity. To do this, in all versions, the force- and/or torque-controlled actuation of drives of the robot arm can be performed by means of impedance control or admittance control. The robot controller can be configured to generate a compliance of the robot arm that is suitable for safe human-robot collaboration, in particular by means of impedance control or admittance control.

Robot arms with associated robot controllers, such as industrial robots, can in particular be so-called lightweight robots, which at first glance differ from conventional industrial robots in that they exhibit a size that is favorable for human-machine collaboration (HRC) and at the same time exhibit a load carrying capacity that is high relative to their own weight.

Such a robot arm, or such a lightweight robot, usually comprises more than six degrees of freedom, thus creating an overdetermined system, as a result of which the same point in space in the same orientation can be achieved in multiple, in particular even an infinite number of different, poses of the robot arm. The lightweight robot can respond to external force effects in appropriate ways. Force sensors, which can measure forces and torques in all three spatial directions, can be used for force measurement. Alternatively or additionally, the external forces can also be calculated without sensors, for example by using the measured motor currents of the drives at the joints of the lightweight robot. An indirect force control, for example by modeling the lightweight robot as a mechanical resistance (impedance), or a direct force control can be used as control concepts.

Aside from that, lightweight robots can as mentioned in particular also be operated in a force- and/or torque controlled, instead of only a position-controlled, manner, which, for instance, makes human-robot collaboration (HRC) much safer. This can also achieve a human-machine collaboration that is so safe that unintended collisions of the robot arm with persons, for example, can either be prevented, or at least mitigated in such a way that the persons and/or workers are not harmed.

Due to the fact that the clamping device inventively comprises a mechanical adjusting device and a triggering device that can be controlled by the robot controller, and the adjusting device is configured to automatically move the fixing device in relation to the base frame from an operating position into a safe position when the triggering device is activated, if an instance of trapping occurs, for example of a body part of a worker, the trapping can be reversed as quickly as possible, i.e. removed. This is particularly advantageous because, in the event of a collision detected by the robot, for safety reasons the robot arm is stopped immediately with a safety-oriented halt and, if the outcome is unfavorable, this may result in the now stationary robot trapping a body part of the worker. Since the robot arm that has been stopped for safety reasons can be brought back into an operational state only very slowly and/or starting the robot can even lead to undesired movements, the inventive mounting device is helpful in very quickly freeing a trapped worker from this position. Since the inventive mounting device preferably does not require any active actuation at all, i.e. works automatically, even in the event of an outage of the electric power supply or in the event of a failure of the robot controller, the inventive mounting device can immediately be brought into the safe position in which potential trapping is reliably eliminated.

The robot can include a collision detection device and the robot controller can be configured and/or equipped, in the event of a detected collision of the robot arm with an obstacle, in particular a person, to activate the triggering device.

The collision detection device can be implemented in the robot controller and can, for example, be configured in a per se known manner. The collision detection device can include separate collision sensors, for instance. These collision sensors can be disposed on the framework of the robot arm for example, i.e., on the links of the robot arm. However, collision detection can also be performed programmatically by the robot controller by evaluating forces and torques in the joints of the robot arm.

The robot can in particular comprise a collision detection device that is configured to detect the trapping of an obstacle, in particular a person or a human body part, between the workpiece or tool being held by the clamping device and the tool or workpiece being held and/or moved by the robot arm or a link of the robot arm itself, and the robot controller can be configured and/or equipped to activate the triggering device in the event of detected trapping.

If a collision is detected by the collision detection device, the robot arm is stopped by the robot controller, in particular in a safety-oriented manner. At the same time, a control signal can be sent to the inventive clamping device, for example via a safe output of the robot controller. Such a control signal may, for example, simply be switching off the electric power supply of the electric holding magnets, which hold the fixing device in the operating position against a spring-bias or against gravity. This means that, in the event of a safety-oriented stop of the robot arm, the robot controller interrupts the power supply of the electric holding magnets, whereby the fixing device automatically, i.e. without the need for a power supply, is moved from the operating position into the safe position.

The mechanical adjusting device can be configured to move the fixing device in a vertical direction, in particular from the operating position into the safe position, relative to the base frame in the direction of gravity.

Such vertical adjustability is particularly useful when the mechanical adjusting device is mounted on the base frame by means of a bearing, in particular a linear guide, in such a way that the fixing device moves automatically into the safe position by means of gravity when the triggering device is activated. In this way, in the operating position, the fixing device can be in a higher vertical position and thus possess higher potential energy. The safe position is then in a lower vertical position, and the fixing device possesses lower potential energy there than in the operating position. The fixing device can thus be moved to the safe position solely due to the potential energy, i.e. by gravitational force. The fixing device can therefore operate in a purely passive manner, i.e. in particular does not require an external power supply.

The mechanical adjusting device can however also be configured to move the fixing device in a horizontal direction relative to the base frame.

Such horizontal adjustability is particularly useful when the mechanical adjusting device is mounted on the base frame by means of a spring-biased bearing, in particular a spring-biased linear guide, in such a way that the fixing device moves automatically into the safe position by means of a biasing force when the triggering device is activated. The spring biased force can be provided by a metallic spring coil, for example, that is stretched in the operating position of the fixing device and moves the fixing device into its safe position when it relaxes. In this type of embodiment, by means of at least one mechanical spring, which of course also stores potential energy, the fixing device can also operate in a purely passive manner, i.e. in particular does not require an external power supply. There are also other design variants, however, in which the mechanical adjusting device can be mounted on the base frame by means of a bearing, in particular a linear guide, in such a way that the fixing device moves automatically into the safe position by means of gravity when the triggering device is activated.

There are also other design variants, however, in which the mechanical adjusting device can be mounted on the base frame by means of a biased bearing, in particular a spring biased linear guide, in such a way that the fixing device moves automatically into the safe position by means of a bias force when the triggering device is activated.

The movement of the fixing device from its operating position into its safe position can, for example, also be carried out on a path that includes both vertical and horizontal direction components. The fixing device can, for example, also be brought from the operating position into the safe position by means of a pivoting movement.

The triggering device can exhibit at least one mechanical holding device, in particular comprising a mechanically actuable latch, and/or a pneumatic holding device, in particular comprising a pneumatically actuatable latch, and/or an electromagnetic holding device, whereby, in a non-activated state of the triggering device, the respective holding device is configured to keep the fixing device in the operating position.

The respective holding device can be configured to release the fixing device when the triggering device is activated, so that the fixing device can automatically move from the operating position into the safe position.

The electromagnetic holding device can exhibit at least one, in particular four, electromagnets, which are attached to the base frame and configured, in a non-activated state of the triggering device, to hold an anchor plate connected to the fixing device in the operating position of the fixing device by means of magnetic force.

BRIEF DESCRIPTION OF THE DRAWINGS

One specific design example of the invention is explained in more detail in the following description with reference to the accompanying figures. Specific features of this design example can represent universal features of the invention independently of the actual context in which they are mentioned, and, as the case may be, can be considered individually or in combination.

The figures show.

DETAILED DESCRIPTION

Figure 1:
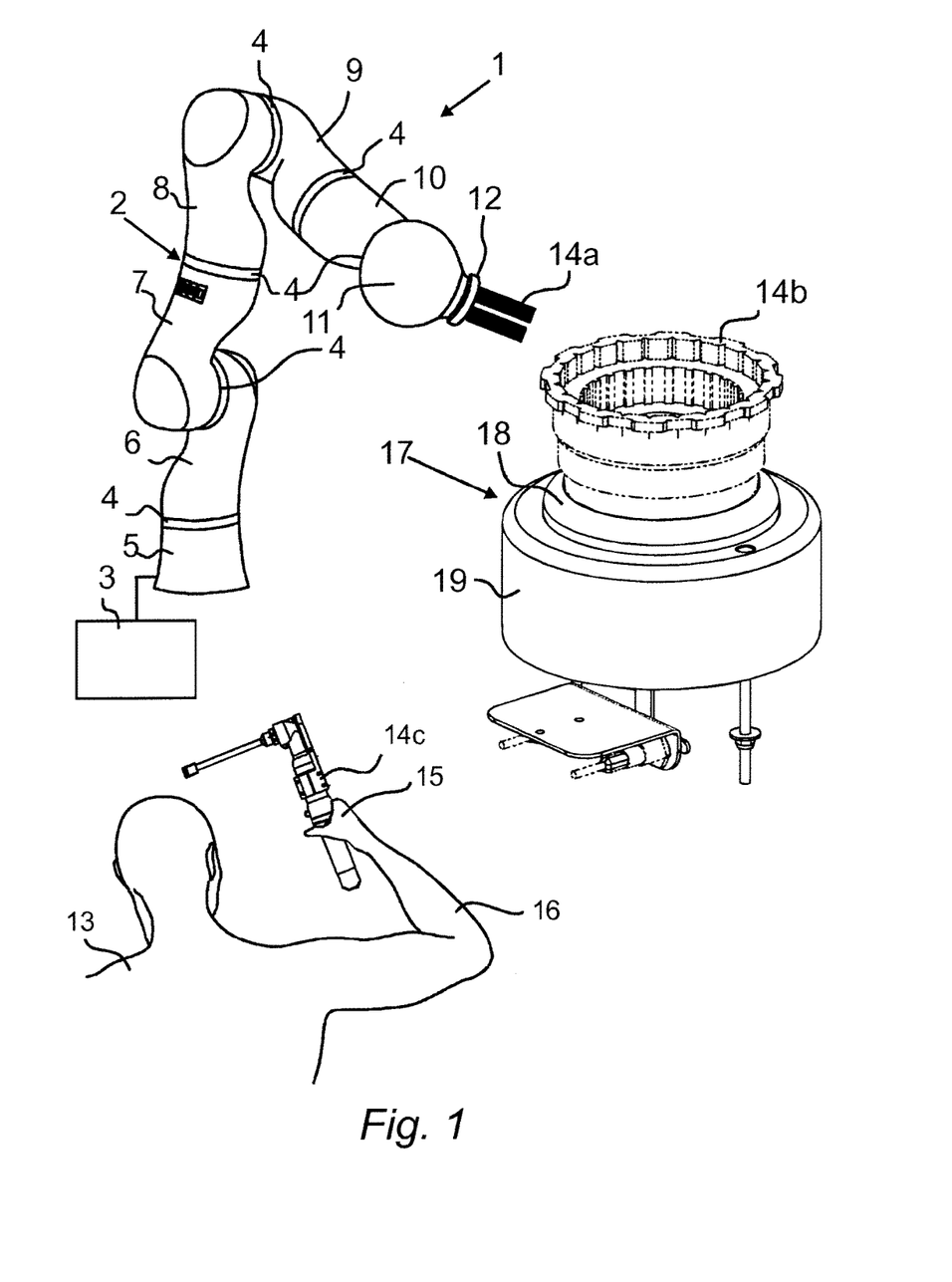
FIG. 1 is a schematic illustration of an exemplary HRC workstation with a robot guiding a tool, a workpiece stationarily disposed on an inventive mounting device and a worker guiding an additional manual tool.

FIG. 1 schematically shows an HRC work station with a robot 1 in an exemplary design as a so-called lightweight robot. The robot 1 comprises a robot arm 2 and a robot controller 3. The robot arm 2 comprises a plurality, in the case of the present design example eight, links 5 to 12, which are arranged one after another and rotatably connected by means of seven joints 4.

The robot controller 3 of the robot 1 is configured or equipped to execute a robot program, via which the joints 4 of the robot arm 2 can be adjusted or rotated in an automated manner in accordance with the robot program or automatically in a manual operation. For this purpose, the robot controller 3 is connected with actuatable electric drives, which are configured to adjust the joints 4 of the robot 1.

An end link 12 of the robot arm 2, which is also referred to as the robot flange, carries a tool 14a. In the case of the present design example, the tool 14a is configured for the automatic machining of a workpiece 14b.

At the exemplary HRC workstation, a worker 13 collaborates with the robot 1. For this purpose the worker 13 operates a manual tool 14c, which he holds in his hand 15 and can move with his arm 16.

The HRC workstation of the present design example further includes a clamping device 17. The clamping device 17 comprises a stationary base frame 19 and a fixing device 18. In the case of the present design example, the fixing device 18 is configured to hold the workpiece 14b in such a way that the workpiece 14b, which is being held on the mounting device 17 and is shown in FIG. 1 with dashed lines, can be mounted and/or machined in an interaction of the robot arm 2 and the worker 13. The base frame 19 is fixedly installed. The base frame 19 can be mounted on the floor of a workshop, for example, or on a gantry connected to the floor of the workshop. To be able to temporarily attach a wide variety of workpieces 14b to the fixing device 18, for example by means of clamping claws, the fixing device 18 can, for example, exhibit bores, grooves and/or dovetail guides. The fixing device 18 can thus generally be configured like a machine table.

Figure 2:
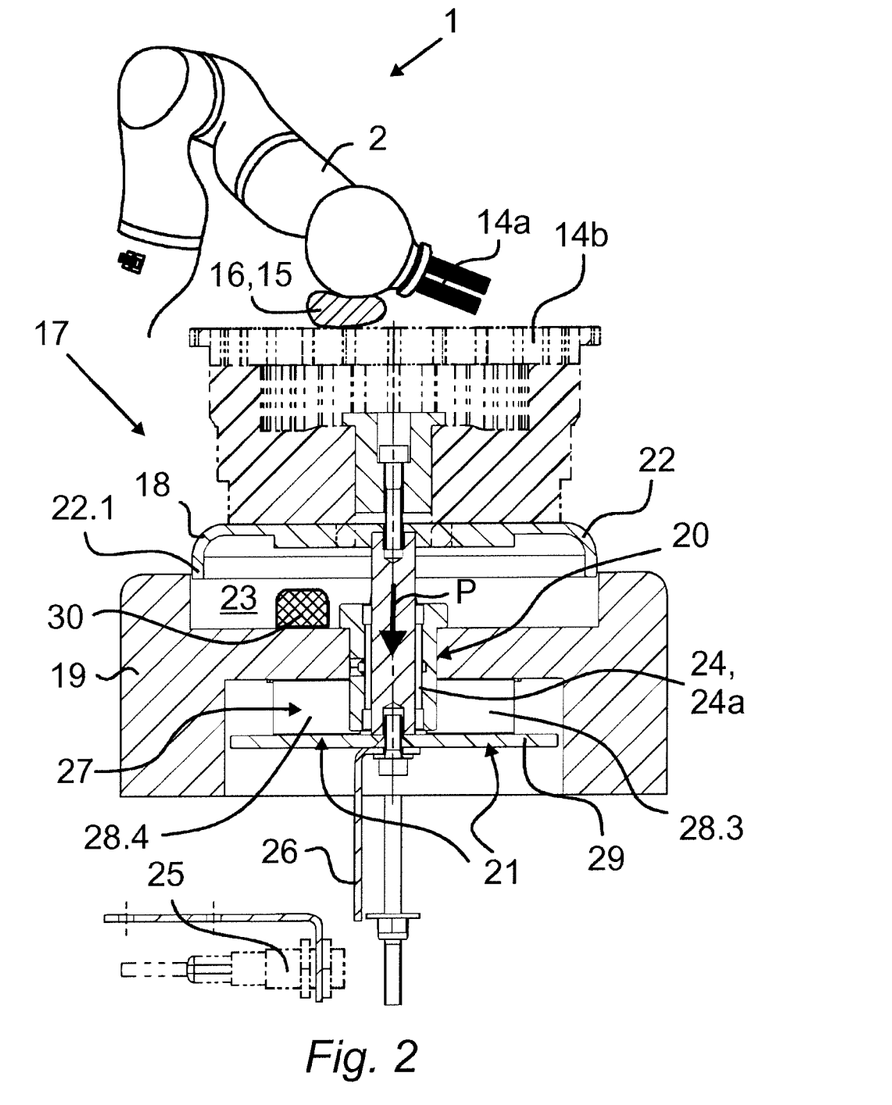
FIG. 2 is an sectional view of the inventive mounting device according to FIG. 1 standing alone in its operating position.
Figure 3:
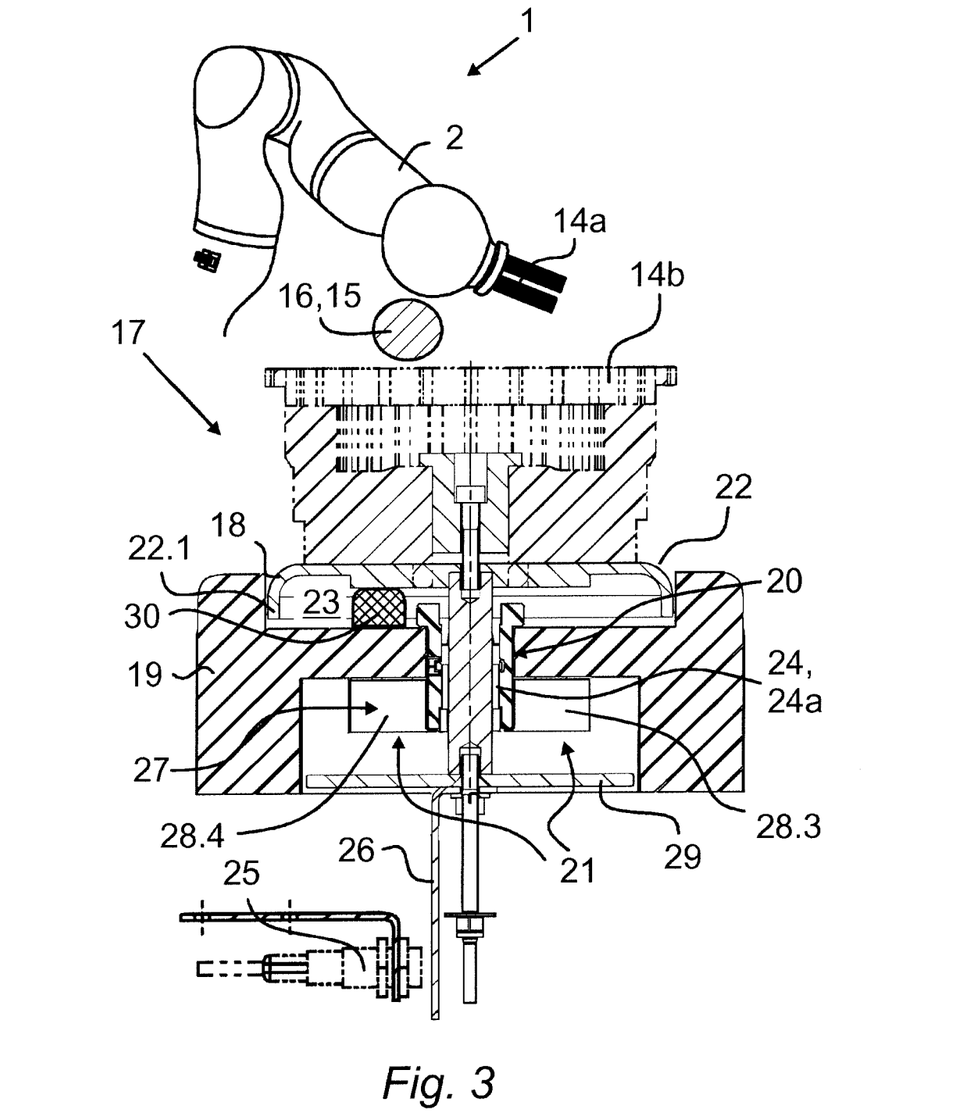
FIG. 3 is a sectional view of the inventive mounting device according to FIG. 1 standing alone in its lowered safe position after the triggering device has been activated.

As shown standing alone in FIG. 2 and FIG. 3, the clamping device 17 includes a mechanical adjusting device 20 and a triggering device 21 that can be actuated by the robot controller 3.

The adjusting device 20 is configured to automatically move the fixing device 18 in relation to the base frame 19, as illustrated by the arrow P, from an operating position, as shown in FIG. 2, to a safe position, as shown in FIG. 3, when the triggering device 21 is activated.

The fixing device 18 exhibits a base plate 22. The base plate 22 can cover a cavity 23 of the base frame 19. The base plate 22 can exhibit a skirt-like downturned edge section 22.1, by means of which engagement into the cavity 23 is prevented when the fixing device 18 is in the operating position shown in FIG. 2. In the safe position according to FIG. 3, the cavity 23 is configured to accommodate the fixing device 18 in its lowered position.

To be able to move the fixing device 18 from the operating position to the lowered safe position, the fixing device 18 is mounted on the base frame 19 by means of a bracket 24, in particular a linear track 24a, in a linearly adjustable manner. By means of the bracket 24, in particular the linear track 24a, the mechanical adjusting device 20 in the case of the present design example is configured to move the fixing device 18 in a vertical direction (arrow P) relative to the base frame 19, i.e. in the direction of gravity, from the operating position into the safe position.

If, by means of its collision detection device, which can be integrated at least partially or completely into the robot controller 3 (FIG. 1), the robot 1 detects a collision—for example, as schematically illustrated in FIG. 2, the robot arm 2 traps the hand 15 or arm 16 of the worker 13 between the robot arm 2 and the workpiece 14b—the triggering device 21 is activated by the robot controller 3.

Due to the mechanical and automatic adjusting device 20 or by means of the bracket 24, in particular the linear track 24a, the fixing device 18 is automatically moved into the safe position, as shown in FIG. 3, by means of gravity when the robot controller 3 activates the triggering device 21.

The fixing device 18 therefore falls downward into the safe position as a result of gravity. To prevent the fixing device 18 from striking the base frame 19 hard, an elastic buffer 30 can be provided to cushion the fixing device 18 that is falling into the safe position.

In the safe position then, as shown schematically in FIG. 3, the clamping effect has been removed, i.e. in the case of the illustrated example, the hand 15 or the arm 16 of the worker 13 is no longer trapped between the robot arm 2 and the workpiece 14b, but has instead been released.

At least one position transducer 25, in particular two in this respect redundantly configured position transducers 25, can include a Hall sensor, for example, and, on a crosspiece 26 that is connected to the lowerable fixing device 18 and which can be a metal strip, detect whether the fixing device 18 is in the safe position, as shown in FIG. 3, or in the operating position, as shown in FIG. 2. The position transducer 25 can be electrically connected to the robot controller 3 and integrated into the control system in such a way that automatic actuation of the robot arm 2 is only possible, if it has been determined automatically via the position transducer 25 that the fixing device 18 is in the operating position.

In the case of the present design example, the triggering device 21 includes an electromagnetic holding device 27. The electromagnetic holding device 27 is configured, in a non-activated state of the triggering device 21, to keep the fixing device 18 in the operating position.

The electromagnetic holding device 27 is configured, in an activated state of the triggering device 21, to release the fixing device 18, so that the fixing device 18 can automatically move from the operating position according to FIG. 2 into the safe position according to FIG. 3.

Figure 4:
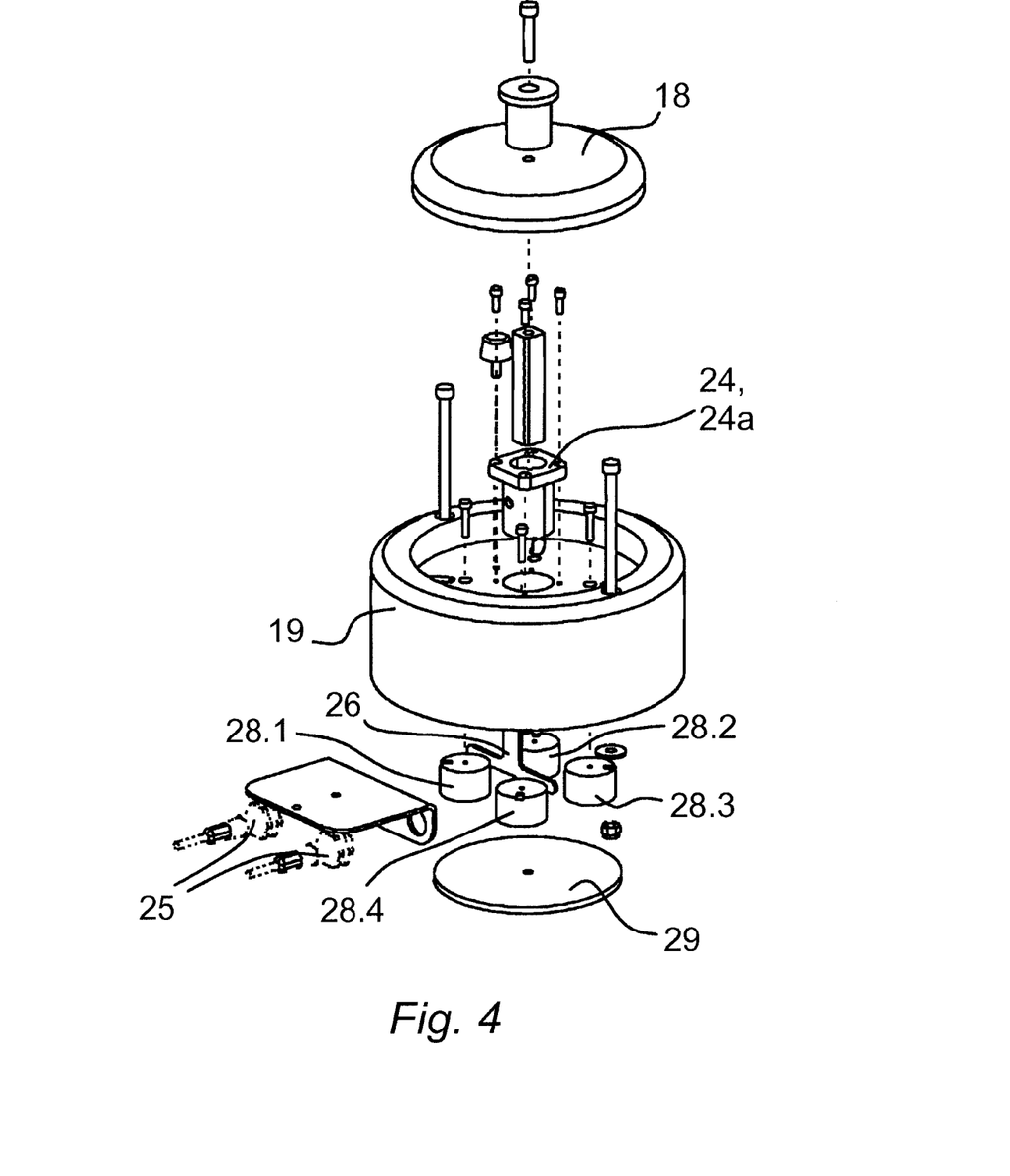
FIG. 4 is an exploded view of the inventive mounting device according to FIG. 1.

FIG. 4 shows clearly that, in the case of the present design example, the electromagnetic holding device 27 exhibits four electromagnets 28.1, 28.2, 28.3, 28.4, which are attached to the base frame 19 and configured, in a non-activated state of the triggering device 21, to hold an anchor plate 29 connected to the fixing device 18 in the operating position according to FIG. 2. of the fixing device by means of magnetic force.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A human-robot collaboration (HRC) workstation, comprising:
    a robot comprising a robot controller and a robot arm including a plurality of joints and links connecting the joints, the joints of which can be automatically adjusted by the robot controller to hold and/or move a tool or workpiece held by the robot arm in a space by adjusting the joints of the robot arm;
    a clamping device with a stationary base frame and a fixing device configured to hold in place the workpiece or the tool, such that at least one of the workpiece or tool being held at the clamping device can be at least one of assembled or machined in interaction with the robot arm;
    the clamping device comprising:
        a mechanical adjusting device, and
        a triggering device that is controllable by the robot controller,
        wherein the mechanical adjusting device is configured to automatically move the fixing device relative to the base frame from an operating position into a safe position when the triggering device is activated; and
    a collision detection device;
    wherein the robot controller activates the triggering device in response to the detection of a collision of the robot arm with an obstacle.

2. The HRC workstation of claim 1, wherein:
    the collision detection device is configured to detect the trapping of an obstacle between one of the workpiece or tool being held by the clamping device, and the other of the tool or workpiece being held or moved by the robot arm, or the trapping of an obstacle between a link of the robot arm and a workpiece or tool being held by the clamping device; and
    the robot controller activates the triggering device in response to the detection of the trapping of an obstacle.

3. The HRC workstation of claim 1, wherein the collision detection device is configured to detect the trapping of a person or a human body part.

4. The HRC workstation of claim 1, wherein the mechanical adjusting device is configured to move the fixing device in a vertical direction relative to the base frame in the direction of gravity.

5. The HRC workstation of claim 4, wherein the mechanical adjusting device is configured to move the fixing device in the vertical direction from the operating position into the safe position.

6. The HRC workstation of claim 1, wherein the mechanical adjusting device is configured to move the fixing device in a horizontal direction relative to the base frame.

7. A human-robot collaboration (HRC) workstation, comprising:
    a robot comprising a robot controller and a robot arm including a plurality of joints and links connecting the joints, the joints of which can be automatically adjusted by the robot controller to hold and/or move a tool or workpiece held by the robot arm in a space by adjusting the joints of the robot arm;
    a clamping device with a stationary base frame and a fixing device configured to hold in place the workpiece or the tool, such that at least one of the workpiece or tool being held at the clamping device can be at least one of assembled or machined in interaction with the robot arm; and the clamping device comprising:
  a mechanical adjusting device, and
  a triggering device that is controllable by the robot controller,
  wherein the mechanical adjusting device is configured to automatically move the fixing device relative to the base frame from an operating position into a safe position when the triggering device is activated; and
  wherein the mechanical adjusting device is mounted on the base frame by a bearing in such a way that the fixing device moves automatically into the safe position by gravity when the triggering device is activated.

8. The HRC workstation of claim 7, wherein the mechanical adjusting device is mounted on the base frame by a linear guide.

9. The HRC workstation of claim 1, wherein the mechanical adjusting device is mounted on the base frame by a spring-biased bearing in such a way that the fixing device moves automatically into the safe position by a bias force when the triggering device is activated.

10. The HRC workstation of claim 9, wherein spring-biased bearing is a spring-biased linear guide.

11. A human-robot collaboration (HRC) workstation, comprising:
  a robot comprising a robot controller and a robot arm including a plurality of joints and links connecting the joints, the joints of which can be automatically adjusted by the robot controller to hold and/or move a tool or workpiece held by the robot arm in a space by adjusting the joints of the robot arm; and
  a clamping device with a stationary base frame and a fixing device configured to hold in place the workpiece or the tool, such that at least one of the workpiece or tool being held at the clamping device can be at least one of assembled or machined in interaction with the robot arm;

the clamping device comprising:
  a mechanical adjusting device, and
  a triggering device that is controllable by the robot controller,
  wherein the mechanical adjusting device is configured to automatically move the fixing device relative to the base frame from an operating position into a safe position when the triggering device is activated;
  wherein the triggering device comprises at least one of a mechanical holding device, a pneumatic holding device, or an electromagnetic holding device; and
  wherein the holding device is configured, in a non-activated state of the triggering device, to keep the fixing device in the operating position.

12. The HRC workstation of claim 11, wherein the holding device is an actuatable latch.

13. The HRC work station of claim 11, wherein the holding device is configured, in an activated state of the triggering device, to release the fixing device so that the fixing device can automatically move from the operating position to the safe position.

14. The HRC workstation of claim 11, wherein the holding device is an electromagnetic holding device and comprises at least one electromagnet attached to the base frame and configured, in a non-activated state of the triggering device, to hold an anchor plate connected to the fixing device in the operating position of the fixing device by means of magnetic force.

15. The HRC workstation of claim 14, wherein the electromagnetic holding device comprises four electromagnets.

* * * * *